United States Patent
Trivedi et al.

(10) Patent No.: US 12,380,272 B1
(45) Date of Patent: Aug. 5, 2025

(54) SYSTEMS AND METHODS TO ANALYZE AND IDENTIFY ADAPTATIONS TO DOCUMENT BASED ON AN AUDIENCE OF THE DOCUMENT TO IMPROVE A DOCUMENT QUALITY

(71) Applicant: Suki AI, Inc., Redwood City, CA (US)

(72) Inventors: Gaurav Trivedi, Pittsburgh, PA (US); Siddharth Sharma, Haryana (IN); Erin Ann Palm, Los Altos Hills, CA (US)

(73) Assignee: Suki AI, Inc., Redwood City, CA (US)

( * ) Notice: Subject to any disclaimer, the term of this patent is extended or adjusted under 35 U.S.C. 154(b) by 405 days.

(21) Appl. No.: 17/855,276

(22) Filed: Jun. 30, 2022

(51) Int. Cl.
*G06F 40/284* (2020.01)
*G06F 40/30* (2020.01)
*G06F 40/44* (2020.01)

(52) U.S. Cl.
CPC .................................. *G06F 40/284* (2020.01)

(58) Field of Classification Search
CPC ...................................................... G06F 40/284
See application file for complete search history.

(56) References Cited

U.S. PATENT DOCUMENTS

| | | | |
|---|---|---|---|
| 10,902,009 B1* | 1/2021 | Lenz, Jr. | G06F 16/24578 |
| 11,301,618 B2* | 4/2022 | Gines Marin | G06V 20/52 |
| 11,561,987 B1* | 1/2023 | Sager | G06F 16/906 |
| 11,860,683 B1* | 1/2024 | Miller | G06F 40/157 |
| 2022/0398379 A1* | 12/2022 | Hou | G06F 40/30 |

* cited by examiner

*Primary Examiner* — Hai Phan
*Assistant Examiner* — Ian Scott Mclean
(74) *Attorney, Agent, or Firm* — Esplin & Associates, PC

(57) ABSTRACT

Systems and methods to analyze and identify adaptations to document based on an audience of the document to improve a document quality are disclosed. Exemplary implementations may: analyze individual documents to determine its active lexicon from lexicons stored in electronic storage that the individual documents are comprised of; store the documents in correlation with the determined active lexicons in the electronic storage; generate, based on the lexicons and the correlations, audience scores for individual ones of the documents; store the audience scores in the electronic storage; receive a request to obtain a document; and effectuate presentation of the document and the audiences scores corresponding to the document.

20 Claims, 5 Drawing Sheets

SYSTEMS AND METHODS TO ANALYZE AND IDENTIFY ADAPTATIONS TO DOCUMENT BASED ON AN AUDIENCE OF THE DOCUMENT TO IMPROVE A DOCUMENT QUALITY

FIELD OF THE DISCLOSURE

The present disclosure relates to systems and methods to analyze and identify adaptations to a document, such as an electronic health document, based on an audience of the document to improve its quality.

BACKGROUND

Physicians often write notes or documents for many audiences to consume at different points in time. This may be unproductive for a specific audience which has to determine relevant information from the note for their knowledge (e.g., communication between providers, patients, and caregivers) or tasks (e.g., invoicing by accounting department) may be unproductive for the physician who has to generate a comprehensive version of the note for the different audiences.

SUMMARY

One aspect of the present disclosure relates to allowing different audiences to quickly retrieve pertinent information from a document, thereby reducing manual fatigue that may be required to review the document in its entirety. In some implementations, the system may analyze the document and determine which lexicon is actively present in and used to generate the document. Audience scores may be determined representing comprehensibility of the document generated with the active lexicon by different audiences. Such audience scores may be presented with the document upon receiving a request for the document. In some implementations, variation suggestions may be generated that facilitate improving the audience scores. In some implementations, the request received may specify a document audience that is to consume the document. Based on the document audience, relevant portions of the document may be determined and visually emphasized. In some implementations, based on the document audience, a document variation may be generated in accordance with a lexicon that corresponds to the document audience. As such the system improves readability based on the audience consuming the document.

One aspect of the present disclosure relates to a system configured to analyze and identify adaptations to document based on an audience of the document to improve a document quality. The electronic storage may store documents, lexicons for different audiences within a knowledge domain, and/or other information. Different ones of the lexicons may include synonyms for terms within the knowledge domain that are suitable for different ones of the audiences associated with the different lexicons.

The system may include one or more hardware processors configured by machine-readable instructions. The machine-readable instructions may include one or more instruction components. The instruction components may include computer program components. The instruction components may include one or more of document analysis component, audience score component, request component, and/or other instruction components.

The document analysis component may be configured to analyze individual ones of the documents to determine its active lexicon from the lexicons stored in the electronic storage that the individual documents are comprised of. The document analysis component may be configured to store the documents in correlation with the determined active lexicons in the electronic storage.

The audience score component may be configured to generate, based on the lexicons, the correlations, and/or other information, audience scores for individual ones of the documents. The audience scores may represent comprehensibility of the individual documents in the active lexicon by each of the different audiences. Individual ones of the audience scores correspond to the different audiences and the individual documents. The audience score component may be configured to store the audience scores in the electronic storage.

The request component may be configured to receive a request to obtain a document. The request component may be configured to effectuate presentation of the document and the audiences scores corresponding to the document.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
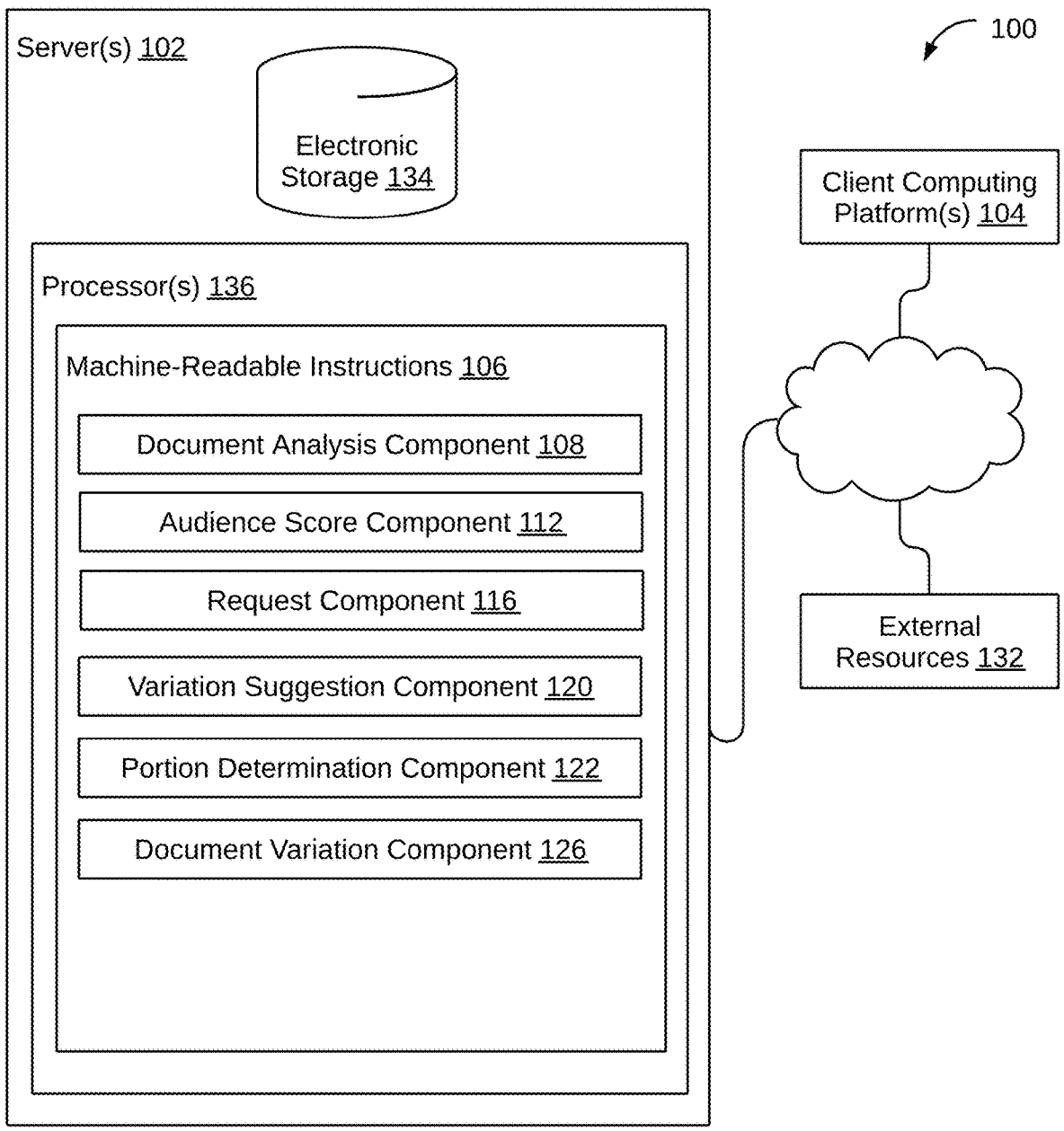
FIG. 1 illustrates a system configured to analyze and identify adaptations to document based on an audience of the document to improve a document quality, in accordance with one or more implementations.

FIG. 1 illustrates a system 100 configured to analyze and identify adaptations to document based on an audience of the document to improve a document quality, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Electronic storage 134 may be configured to store documents, lexicons for different audiences within a knowledge domain, language models, metadata information, identifying information. The documents may include notes, records, electronic medical records, transcripts derived from audio dictations, lectures, and/or other documents. Knowledge domains may include medical field, automotive field, law and law enforcement, civil engineering, mechanical engineering, chemical engineering, insurance field, and/or other knowledge domains. The different audiences may include medical professionals, legal professionals, law enforcement professionals, accounting and billing professionals, compliance and administrative personnel, a layman to the knowledge domain of the document (e.g., patients), journalists, and/or other audiences. The compliance and administrative personnel may ensure procedures and protocols are being followed.

The different audiences of a document may refer to different users that may consume the document. Individual ones of the lexicons may be associated with one of the knowledge domains, an audience, and/or other information. Multiple ones of the lexicons may be associated with the same knowledge domain. As such, a lexicon may comprise a set of terms and/or phrases comprehensible by the associated audience and related to the knowledge domain. The different ones of the lexicons may include synonyms for the terms and/or phrases within the knowledge domain that are suitable for the associated audiences. The synonyms may refer to terms and/or phrases that may be alternatively used to convey the same meaning. In some implementations, the synonyms may be known and/or commonly used. In some implementations, the synonyms may be input by users as an alternative to particular terms and/or phrases. In some implementations, the synonyms are determined by way of effectuating analysis and machine learning techniques upon the documents (e.g., by document analysis component 108). A Language model may contain the lexicon and maintain a probabilistic distribution of how the terms and/or phrases occur in the particular knowledge domain. References to "lexicon" as used herein, in some implementations, may alternatively refer to language models.

By way of non-limiting example, a first knowledge domain may be the medical field. A first audience of a first document may be the medical professionals and a second audience of the first document may be medical patients. A first lexicon may include terms and phrases that the medical professionals use to describe injuries, procedures, treatments, biology of the body, anatomy, and/or other medical-related topics. The first lexicon may include a first phrase "metastasize". A second lexicon within the first knowledge domain be for the second audience and include a second phrase "spread to another area of the body" that is a synonym of the first phrase and comprehensible or suitable for the second audience, i.e., the medical patients.

The metadata information may include one or more users that contributed to the documents, one or more subjects of the documents, timing information for when the documents were generated and/or edited, and/or other metadata information. The one or more users that contributed to the documents may include a user that generated the entire document, a user that generated preliminary information included in the document, a user that reviewed and/or approved the document, a user that added additional information into the document, and/or other users. By way of non-limiting example, a nurse (user) may generate the preliminary information for a patient prior to a doctor (user) examining a patient (subject) and documenting the exam in a document. The one or more subjects of the document may include people and/or objects. By way of non-limiting example, the patient may be the subject. In another example, the patient and an implant in the patient may be the subjects. In another example, a vehicle may be the subject. The preliminary information may include qualitative and/or quantitative information of the subject to be included in the document and describe the subject generally and/or at a time of generation. By way of non-limiting example, the preliminary information may include vitals for the patient (e.g., blood pressure, weight, height, oxygen levels, etc.), manufacture and usage of a vehicle (e.g., make, model, year, mileage, tire pressure, etc.), among others.

The timing information may include a date, a time of day, a duration to generate the document, durations to generate portions of the document (e.g., the preliminary information), a time of review of the document, a time of approval of the document, a time of finalization of the document, and/or other timing information.

The users and the subjects may be associated with the identifying information. The identifying information may include a name, a birthdate, login identification, one or more credentials, and/or other information. The login information may be specific to a system that system 100 is utilized by. By way of non-limiting example, the credentials may include a level of education (e.g., Bachelor of Science), a practice knowledge (e.g., Doctor of Medicine, nurse practitioner, entry-level technician, master technician, software engineer), title (e.g., paralegal, docket specialist) and/or other credentials. In some implementations, some or all of the identifying information may be included in the document.

Server(s) 102 may be configured by machine-readable instructions 106. Machine-readable instructions 106 may include one or more instruction components. The instruction components may include computer program components. The instruction components may include one or more of document analysis component 108, audience score component 112, request component 116, variation suggestion component 120, portion determination component 122, document variation component 126, and/or other instruction components.

Document analysis component 108 may be configured to analyze individual ones of the documents to determine its active lexicon from the lexicons stored in electronic storage 134 that the individual documents are comprised of. Analyzing the individual documents may be performed by effectuating discourse analysis, thematic analysis, content analysis, interpretive analysis, and/or other analysis techniques. The active lexicon of a given document is the lexicon used by a user to generate or otherwise create the document. Thus, the given document is comprehensive by and suitable for the user that created the document. By way of non-limiting example, the first document may be generated by a first user (e.g., a doctor) of the first audience. As such, the first document may be generated by a medical professional and its active lexicon is the first lexicon. Document analysis component 108 may be configured to store the documents in correlation with the determined active lexicon(s) in electronic storage 134. That is, the correlation specifies that the document is in the active lexicon determined.

In some implementations, document analysis component 108 may be configured to analyze a set of the documents to determine the synonyms for the terms and/or phrases and thus the lexicons for a given knowledge domain. The analysis may be way of effectuating machine learning techniques, discourse analysis, thematic analysis, content analysis, interpretive analysis, and/or other known or novel techniques. The determined synonyms may be added to existing lexicons in electronic storage 134 and/or may comprise a new lexicon for a new audience.

Audience score component 112 may be configured to generate audience scores for individual ones of the documents. The generation of the audience scores may be based on the lexicons, the correlations, and/or other information. Determining the audience scores may be based on the terms and/or phrases from the lexicons present in the individual documents, frequency of the presences of the terms and/or phrases from the lexicons, and/or other information. By way of non-limiting example, the audience scores may include one of a percentage, a value within a predetermined range (e.g., 1-10), a letter score, and/or other format for the audience score. In some implementations, the audience score may be presented and associated with a visual score that visually indicates the audience score. Individual ones of the audience scores correspond to the different audiences and the individual documents. The audience scores may represent comprehensibility of the individual documents in the active lexicon by each of the different audiences they correspond to. The comprehensibility may refer to how well or how much of the document that the user understands. That is, a first audience score related the first audience and for the first document may present how well users within the first audience would understand the document with its active lexicon. For example, a 10 out of 10 audience score for the first audience and the first document may mean that the first audience, the medical professionals, may comprehend the document. A 4 out of 10 audience score for the second audience and the first document may mean that the second audience, the patient, may comprehend some but not the entirety of the first document. Audience score component 112 may be configured to store the audience scores in electronic storage 134.

Request component 116 may be configured to receive a request to obtain a document. Request component 116 may be configured to effectuate presentation of the document and the audiences scores corresponding to the document. Based on the lexicons stored in electronic storage 134, an audience score may be presented for each of the lexicons and the audience associated with those lexicons.

In some implementations, as new lexicons are developed for new audiences, the document may be requested, and additional audience scores may be generated for the new lexicons and their audiences. Furthermore, as the lexicons evolve based on the document analyses, the audience scores may be updated upon a request for the document subsequent to the evolution of the lexicons.

In some implementations, variation suggestion component 120 may be configured to generate variation suggestions to implement for the different audiences that correspond to the audience scores. The variation suggestions may include actions to improve the audience scores and thus improve the comprehensibility of the document by the audiences that are different than the audience that is associated with the active lexicon. Variation suggestion component 120 may be configured to identify one or more portions of the document that include terms and/or phrases not commonly used outside a context of the knowledge domain, terms and/or phrases not commonly used inside a context of the knowledge domain, terms and/or phrases over a particular amount of characters, terms and/or phrases over a particular amount of syllables, and/or other portions that variation suggestions may be for. The amount of the characters and the amount of syllables may be predefined and fixed, or may be modifiable by an administrative user and/or the users that are part of one of the audiences of the documents. Variation suggestion component 120 may be configured to effectuate presentation of the variation suggestions in conjunction with the audience scores.

By way of non-limiting example, the variation suggestions may include rephrase the one or more portions of the document, provide a synonym for the one or more terms in the document, provide a diagram for the one or more portions, provide a status (e.g., good, okay, bad) for the one or more portions, provide a priority ranking, and/or other variation suggestions. The variation suggestions may facilitate improvement of the audience scores and the comprehensibility of the document. The rephrasing may of the one or more portions may clarify a meaning and/or significance of the one or more portions. The providing of the synonym for the one or more terms may clarify a meaning and facilitate with document variation generation. The providing of the diagram may illustrate the one or more portions to provide clarification. The providing of the status may simplify a state of the one or more portions (e.g., blood test result). The providing of the priority ranking may emphasis the portions that are most important to less important.

In some implementations, the request may include a document audience for the document. The document audience may be one of the audiences that is associated with one of the lexicons and that a user requesting the document is a part of. The request may be received from client computing platform 104 associated with the user that is the document audience. In some implementations, the request may include the identifying information of the user requesting the document, and thus be received by request component 116. In some implementations, the document audience may be determined based on the identifying information and/or be indicated by the identifying information. In some implementations, the document audience may be specified or indicated by the user, whether the user is the document audience or not.

In some implementations, the identifying information may be compared to the metadata information of the document requested. Thus, request component 116 may be configured to determine whether a user that contributed to the document and/or subjects of the document is the document audience based on the identifying information and the metadata information.

In some implementations, portion determination component 122 may be configured to determine, based on the document audience, the lexicon associated with the audience that is the same as the document audience, the analysis techniques, and/or other information, portions of the document that are relevant to the document audience. The portions that are relevant to the document audience may be portions that the document audience may comprehend, need to know, and/or have other relevancy.

Portion determination component 122 may be configured to effectuate presentation of visual indicators that emphasize the relevant portions of the document. The visual indicators may include color highlight of the portions, bolding the portions, underlining the portions, italicizing the portions, blurring other portions that are the relevant portions, color text of the portions, and/or other visual indicators. In some implementations, a selection of one or more of the visual indicators may be received from client computing platform 104 associated with the user to emphasis the relevant portions. In some implementations, the visual indicators may be predefined and fixed.

In some implementations, document variation component 126 may be configured to generate a document variation of the document with the lexicon that corresponds to the document audience based on the lexicons, machine learning techniques, the document audience, and/or other information. The document variation may be a version of the document that is suitable and comprehendible by the document audience. In some implementations, the document variation may be a separate document and stored in correspondence with the document in electronic storage 134. In some implementations, the document variation may be an addition to the document.

Document variation component 126 may be configured to effectuate presentation of the visual indicators to emphasize portions of the document variation that are different from the document. The visual indicators may be selectable to present the differences between the document variation and the document or hide the differences. Document variation component 126 may be configured to effectuate presentation of the document variation to the document audience. In some implementations, the document variation may be presented simultaneously to the document.

Figure 3A:
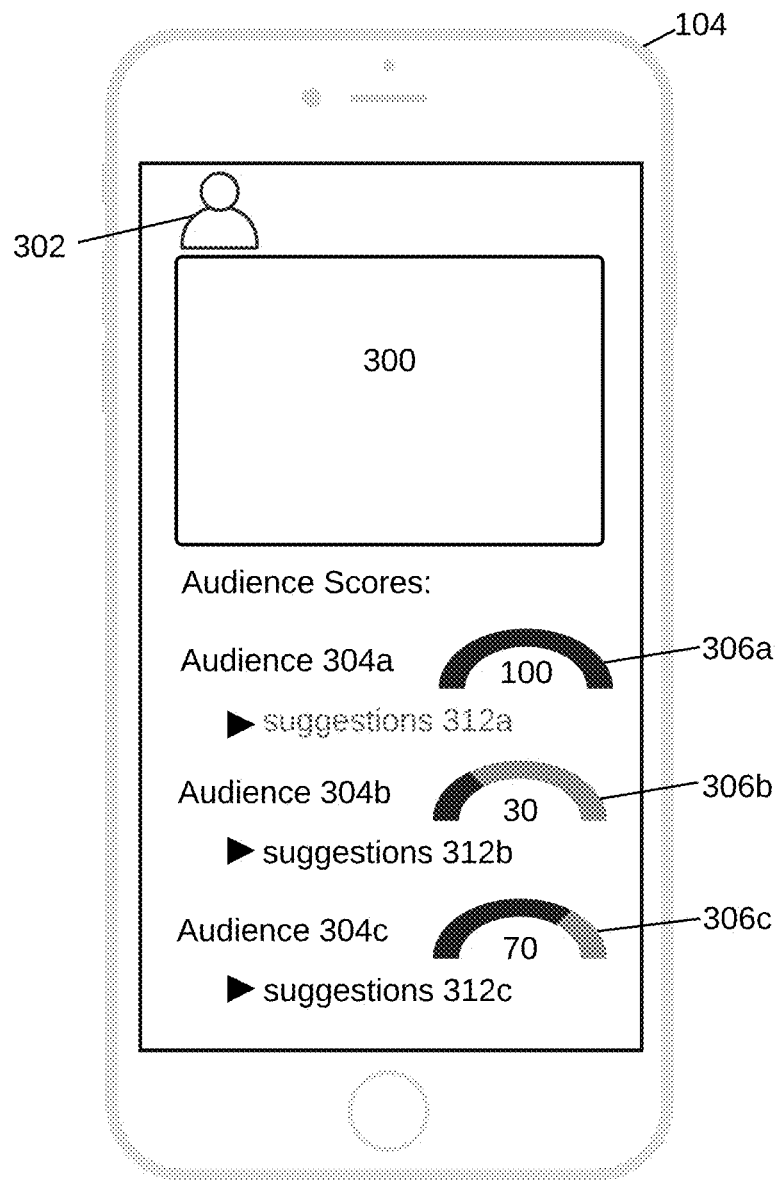
FIG. 3A-C illustrate an example implementation of the system configured to analyze and identify adaptations to document based on an audience of the document to improve a document quality, in accordance with one or more implementations.

FIG. 3A illustrates a document 300 requested by a user 302 via client computing platform 104 (the same as or similar to FIG. 1). Responsive to the request (not illustrated), document 300 may be presented in addition to audience scores 306a-c for audiences 304a-c, respectively. Audience scores 306a-c may include a visual symbol (e.g., arch bar) and/or a numerical value that represent how well the respective audience may comprehend document 300. In some implementations, audience score 306a-c may be presented with (variation) suggestions 312a-c for audiences 304a-c. suggestions 312a-c may include suggestions to improve corresponding audience score. In some implementations, where the audience score is perfect, such as audience score 306a, there may be no variation suggestions (e.g., suggestions 312a is greyed out).

Figure 3B:
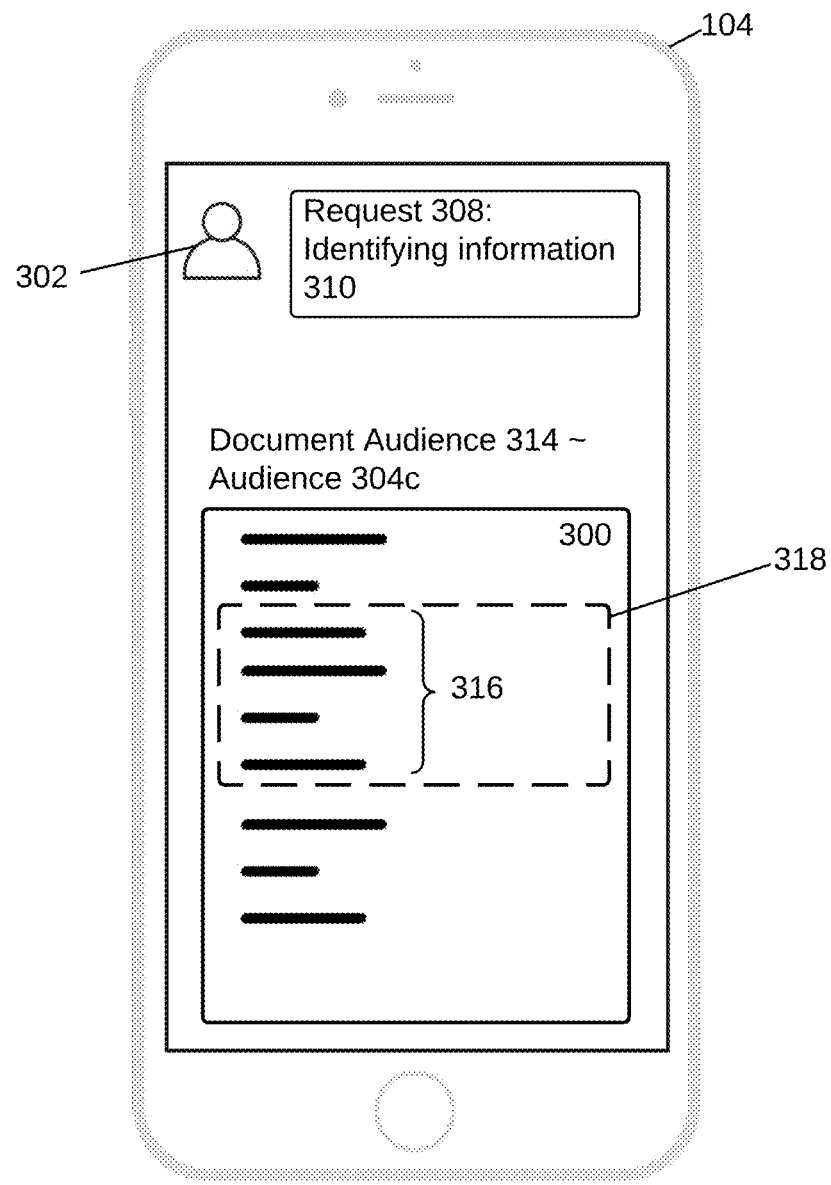

Similar to FIG. 3A, FIG. 3B illustrates a request 308, that may be provided by user 302, that includes identifying information 310 describing and/or identifying a document audience 314 of document 300. Document audience 314 (e.g., user 302 or another user) may be determined to be a part of audience 304c. Based on audience 304c, portion 316 of document 300 may be determined and visual indicator 318 may emphasis portion 316. Portion 316 may be the most relevant or important portion of document 300 for audience 304c. Thus, portion 316 is emphasized for audience 304c to consume. Request 308, document 300, portion 316, and visual indicator 318 may be presented via client computing platform 104.

Figure 3C:
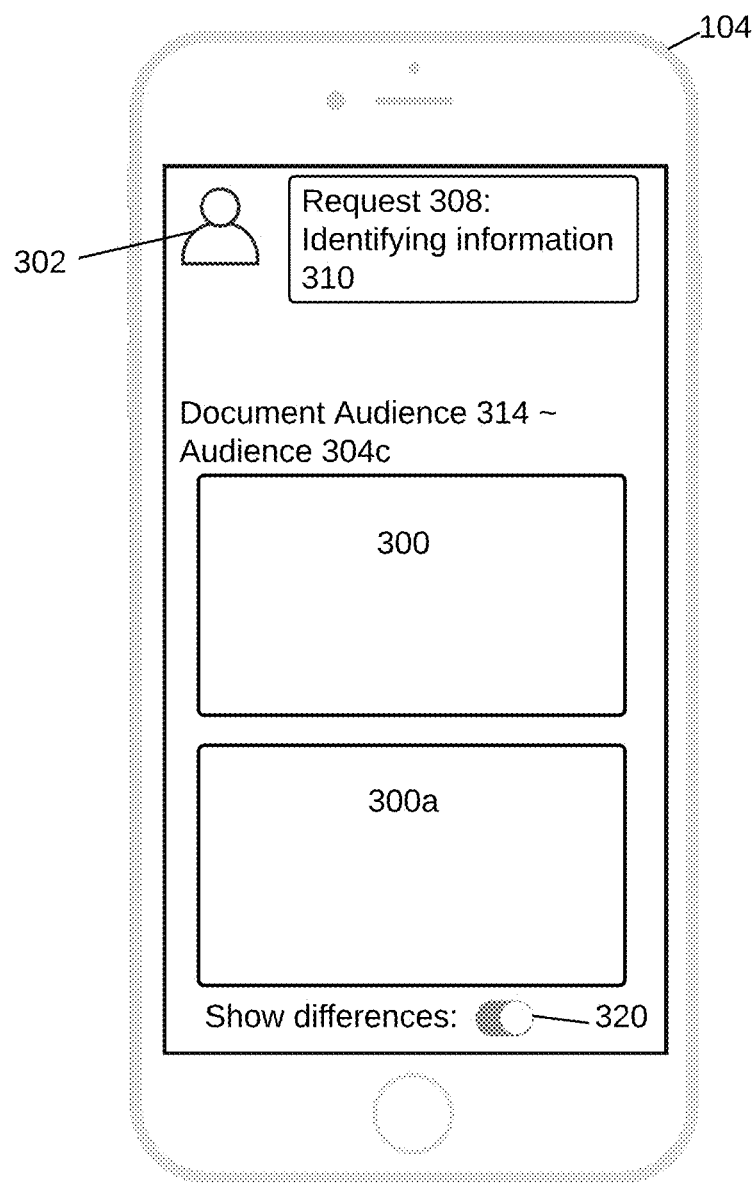

Similar to FIG. 3B, FIG. 3C illustrates document 300 requested by user 302 in request 308 that includes identifying information 310 to determine document audience 314 of document 300. Based on determining document audience 314 is part of audience 304c, a document variation 300a of document 300 may be generated and presented via client computing platform 104. Document variation 300a may be generated to be understandable by audience 304c. A difference option 320 may be presented to show differences between document 300 and document 300a, or to hide the differences. Request 308, document 300, variation document 300a, and difference option 320 may be presented via client computing platform 104.

In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 108, 112, 116, 120, 122, and/or 126, and/or other components. Processor(s) 136 may be configured to execute components 108, 112, 116, 120, 122, and/or 126, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 112, 116, 120, 122, and/or 126 are illustrated in FIG. 1 as being implemented within a single processing unit, in implementations in which processor(s) 136 includes multiple processing units, one or more of components 108, 112, 116, 120, 122, and/or 126 may be implemented remotely from the other components. The description of the functionality provided by the different components 108, 112, 116, 120, 122, and/or 126 described below is for illustrative purposes, and is not intended to be limiting, as any of components 108, 112, 116, 120, 122, and/or 126 may provide more or less functionality than is described. For example, one or more of components 108, 112, 116, 120, 122, and/or 126 may be eliminated, and some or all of its functionality may be provided by other ones of components 108, 112, 116, 120, 122, and/or 126. As another example, processor(s) 136 may be configured to execute one or more additional components that may perform some or all of the functionality attributed below to one of components 108, 112, 116, 120, 122, and/or 126.

Figure 2:
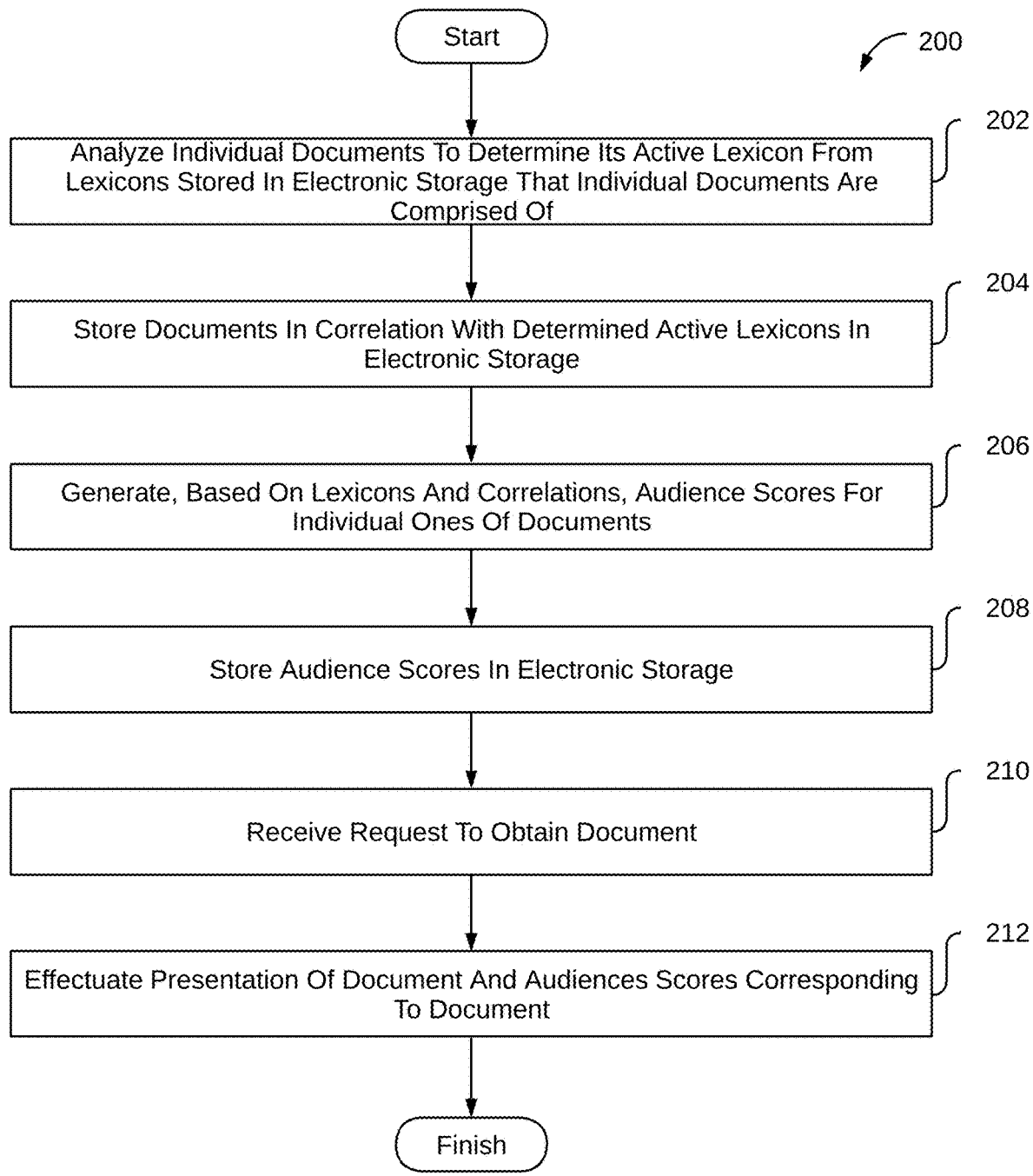
FIG. 2 illustrates a method to analyze and identify adaptations to document based on an audience of the document to improve a document quality, in accordance with one or more implementations.

FIG. 2 illustrates a method 200 to analyze and identify adaptations to document based on an audience of the document to improve a document quality, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include analyzing individual documents to determine its active lexicon from lexicons stored in electronic storage that the individual documents are comprised of. The electronic storage may store the documents. The lexicons may be for different audiences within a knowledge domain. Different ones of the lexicons may include synonyms for terms within the knowledge domain that are suitable for different ones of the audiences associated with the different lexicons. Operation 202 may be performed by one or more hardware processors configured by machine-readable instructions including a component that is the same as or similar to document analysis component 108, in accordance with one or more implementations.

An operation 204 may include storing the documents in correlation with the determined active lexicons in the electronic storage. Operation 204 may be performed by one or more hardware processors configured by machine-readable instructions including a component that is the same as or similar to document analysis component 108, in accordance with one or more implementations.

An operation 206 may include generating, based on the lexicons and the correlations, audience scores for individual ones of the documents. The audience scores may represent comprehensibility of the individual documents in the active lexicon by each of the different audiences. Individual ones of the audience scores correspond to the different audiences and the individual documents. Operation 206 may be performed by one or more hardware processors configured by machine-readable instructions including a component that is the same as or similar to audience score component 112, in accordance with one or more implementations.

An operation 208 may include storing the audience scores in the electronic storage. Operation 208 may be performed by one or more hardware processors configured by machine-readable instructions including a component that is the same as or similar to audience score component 112, in accordance with one or more implementations.

An operation 210 may include receiving a request to obtain a document. Operation 210 may be performed by one or more hardware processors configured by machine-readable instructions including a component that is the same as or similar to request component 116, in accordance with one or more implementations.

An operation 212 may include effectuating presentation of the document and the audiences scores corresponding to the document. Operation 212 may be performed by one or more hardware processors configured by machine-readable instructions including a component that is the same as or similar to request component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to analyze and identify adaptations to a document based on an audience of the document to improve a document quality, the system comprising:
   electronic storage configured to store documents and/or lexicons for different audiences within different knowledge domains, wherein different ones of the lexicons include synonyms for terms within the different knowledge domains that are suitable for different ones of the audiences associated with the different lexicons, the audiences including medical professionals, accounting professionals, and compliance and administrative personnel;
   one or more processors configured by machine-readable instructions to:
      analyze individual ones of the documents to determine its active lexicon from the lexicons that the individual documents are comprised of;
      store the documents in correlation with the determined active lexicons in the electronic storage;
      generate, based on the lexicons and the correlations, audience scores for individual ones of the documents, wherein the audience scores represent comprehensibility of the individual documents in the active lexicon by each of the different audiences, wherein individual ones of the audience scores correspond to the different audiences and the individual documents, further wherein for a given document, a medical audience score is generated to represent comprehensibility of the given document by the medical professionals, an accounting audience score is generated to represent comprehensibility of the given document by the accounting professionals, and a compliance audience score is generated to represent comprehensibility of the given document by the compliance and administrative personnel;
      store the audience scores in the electronic storage;
      receive a request to obtain the given document for consumption by a given user;
      effectuate presentation of a view of the given document and the audience scores corresponding to the given document on a client computing platform, the view of the given document and the audience scores presented on the client computing platform including separate visual elements for individual ones of the audio scores for the given document, wherein the view of the given document and the audience scores presented on the client computing platform includes separate visual elements for the medical audience score, the accounting audience score, and the compliance audience score; and
      effectuate presentation of a view of the given user and a given audience to which the given user is determined to belong on the client computing platform, the view of the given user and the given audience to which the given user is determined to belong presented on the client computing platform including separate visual elements to identify the given user and the given audience to which the given user is determined to belong, the view of the given user and the given audience to which the given user is determined to belong presented on the client computing platform including a first visual element to identify the given user that is to consume the given document and a second visual element separate from the first visual element to identify the given audience to which the given user is determined to belong.

2. The system of claim 1, wherein the one or more processors are further configured by the machine-readable instructions to:
   generate variation suggestions to implement for the different audiences that correspond to the audience scores, wherein the variation suggestions facilitate improvement of the audience scores and the comprehensibility of the given document, wherein the variation suggestions for the given document include a medical variation suggestion to improve the medical audience score for the given document and improve the comprehensibility of the given document by the medical professionals, an accounting variation suggestion to improve the accounting audience score for the given document and improve the comprehensibility of the given document by the accounting professionals, and a compliance variation suggestion to improve the compliance audience score for the given document and improve the comprehensibility of the given document by the compliance and administrative personnel; and
   effectuate presentation of the variation suggestions in conjunction with the audience scores.

3. The system of claim 2, wherein the variation suggestions include rephrase of one or more portions of the given document, provide a synonym for one or more terms in the given document, and/or provide a diagram for the one or more portions.

4. The system of claim 1, wherein the audiences further include patients and/or legal professionals.

5. The system of claim 1, wherein the audience scores include one of a percentage, a value within a predetermined range, and a letter score.

6. The system of claim 1, wherein the one or more processors are further configured by the machine-readable instructions to:
   determine portions of the document that are relevant to the given user that is to consume the given document based on the given audience to which the given user is determined to belong; and
   effectuate presentation of visual indicators on the given document that emphasize the portions of the given document that are relevant to the given user.

7. The system of claim 6, wherein the visual indicators include color highlight, bolding the portions, underlining the portions, and/or italicizing the portions of the given document that are relevant to the given user.

8. The system of claim 1, wherein:
   a document variation of the given document is generated for the given user that is to consume the given document based on the given audience to which the given user is determined to belong; and
   the given document and the document variation of the given document for the given user are presented at the same time.

9. The system of claim 8, wherein the one or more processors are further configured by the machine-readable instructions to:
   effectuate presentation of a difference option, where user interaction with the difference options causes difference between the document variation of the given document and the given document to be shown or hidden.

10. The system of claim 1, wherein the electronic storage is further configured to store metadata information and identifying information, the identifying information included within the request to obtain the given document for consumption by the given user, wherein the metadata information includes one or more users that contributed to the documents, one or more subjects of the documents, timing information for when the documents were generated and/or edited, wherein the identifying information includes a name, a birthdate, login identification, and/or one or more credentials, wherein the users and the subjects are associated with the identifying information, wherein the one or more processors are further configured by the machine-readable instructions to:

determine the given user that is to consume the given document based on the identifying information included in the request.

11. A method to analyze and identify adaptations to a document based on an audience of the document to improve a document quality, the method comprising:

analyzing individual documents to determine its active lexicon from lexicons stored in electronic storage that the individual documents are comprised of, wherein the electronic storage stores the documents, wherein the lexicons are for different audiences within different knowledge domains, wherein different ones of the lexicons include synonyms for terms within the different knowledge domain that are suitable for different ones of the audiences associated with the different lexicons, the audiences including medical professionals, accounting professionals, and compliance and administrative personnel;

storing the documents in correlation with the determined active lexicons in the electronic storage;

generating, based on the lexicons and the correlations, audience scores for individual ones of the documents, wherein the audience scores represent comprehensibility of the individual documents in the active lexicon by each of the different audiences, wherein individual ones of the audience scores correspond to the different audiences and the individual documents, further wherein for a given document, a medical audience score is generated to represent comprehensibility of the given document by the medical professionals, an accounting audience score is generated to represent comprehensibility of the given document by the accounting professionals, and a compliance audience score is generated to represent comprehensibility of the given document by the compliance and administrative personnel;

storing the audience scores in the electronic storage;

receiving a request to obtain the given document for consumption by a given user;

effectuating presentation of a view of the given document and the audience scores corresponding to the given document on a client computing platform, the view of the given document and the audience scores presented on the client computing platform including separate visual elements for individual ones of the audio scores for the given document, wherein the view of the given document and the audience scores presented on the client computing platform includes separate visual elements for the medical audience score, the accounting audience score, and the compliance audience score; and effectuating presentation of a view of the given user and a given audience to which the given user is determined to belong on the client computing platform, the view of the given user and the given audience to which the given user is determined to belong presented on the client computing platform including separate visual elements to identify the given user and the given audience to which the given user is determined to belong, the view of the given user and the given audience to which the given user is determined to belong presented on the client computing platform including a first visual element to identify the given user that is to consume the given document and a second visual element separate from the first visual element to identify the given audience to which the given user is determined to belong.

12. The method of claim 11, further comprising:

generating variation suggestions to implement for the different audiences that correspond to the audience scores, wherein the variation suggestions facilitate improvement of the audience scores and the comprehensibility of the given document, wherein the variation suggestions for the given document include a medical variation suggestion to improve the medical audience score for the given document and improve the comprehensibility of the given document by the medical professionals, an accounting variation suggestion to improve the accounting audience score for the given document and improve the comprehensibility of the given document by the accounting professionals, and a compliance variation suggestion to improve the compliance audience score for the given document and improve the comprehensibility of the given document by the compliance and administrative personnel; and effectuating presentation of the variation suggestions in conjunction with the audience scores.

13. The method of claim 12, wherein the variation suggestions include rephrase of one or more portions of the given document, provide a synonym for one or more terms in the given document, and/or provide a diagram for the one or more given portions.

14. The method of claim 11, wherein the audiences further include patients and/or legal professionals.

15. The method of claim 11, wherein the audience scores include one of a percentage, a value within a predetermined range, and a letter score.

16. The method of claim 11, further comprising:

determining portions of the document that are relevant to the given user that is to consume the given document based on the given audience to which the given user is determined to belong; and effectuating presentation of visual indicators on the given document that emphasize the portions of the given document that are relevant to the given user.

17. The method of claim 16, wherein the visual indicators include color highlight, bolding the portions, underlining the portions, and/or italicizing the portions of the given document that are relevant to the given user.

18. The method of claim 11, wherein:

document variation of the given document is generated for the given user that is to consume the given document based on the given audience to which the given user is determined to belong; and the given document and the document variation of the given document for the given user are presented at the same time.

19. The method of claim 18, further comprising:

effectuating presentation of a difference option, where user interaction with the difference options causes difference between the document variation of the given document and the given document to be shown or hidden.

20. The method of claim 11, wherein the electronic storage is further configured to store metadata information and identifying information, the identifying information included within the request to obtain the given document for consumption by the given user, wherein the metadata information includes one or more users that contributed to the documents, one or more subjects of the documents, timing information for when the documents were generated and/or edited, wherein the identifying information includes a name, a birthdate, login identification, and/or one or more credentials, wherein the users and the subjects are associated with the identifying information, further comprising:
   determining the given user that is to consume the given document based on the identifying information included in the request.

\* \* \* \* \*